June 5, 1923.
E. LASHER
VEHICLE SEAT
Filed March 5, 1921
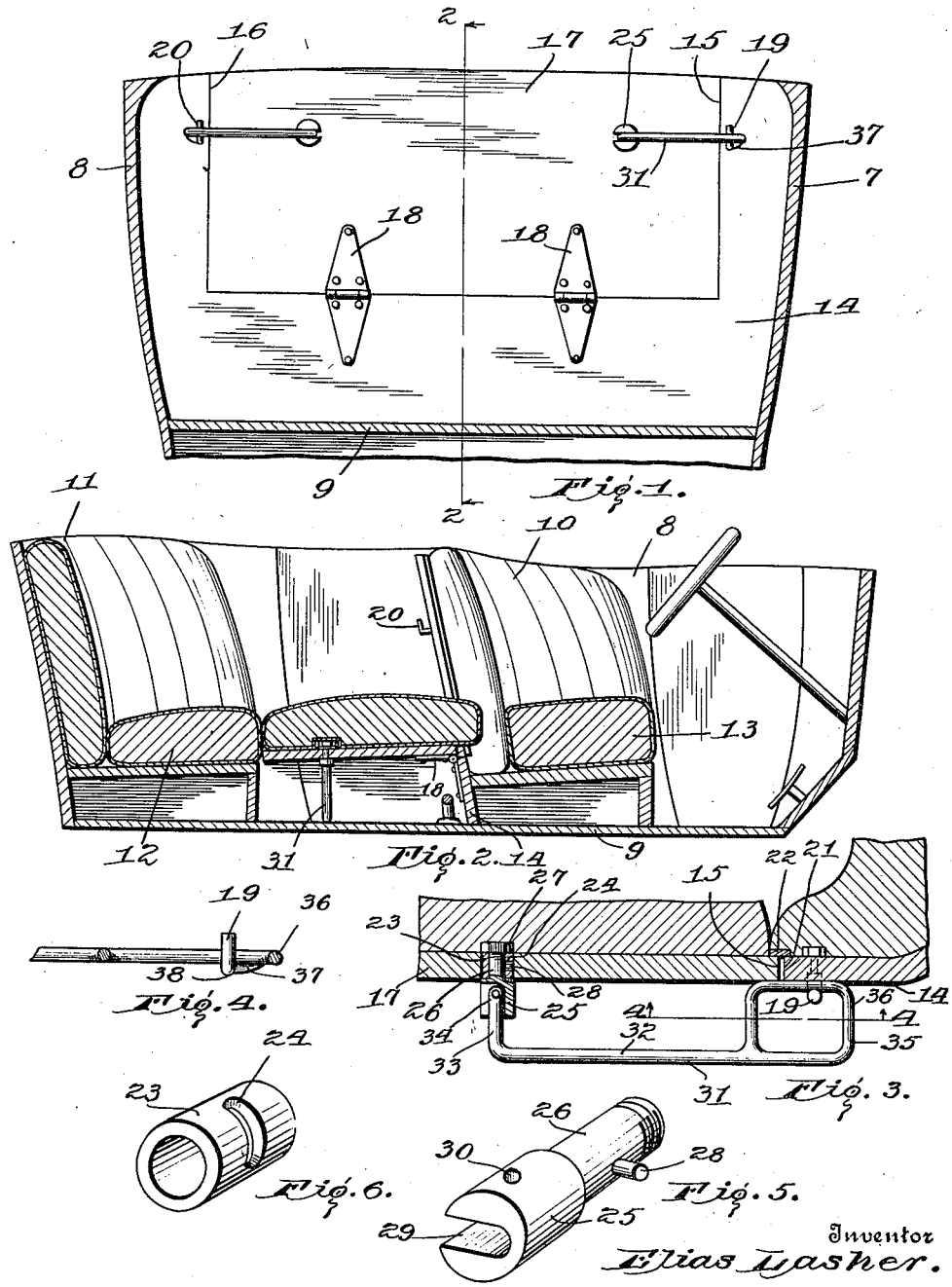

Patented June 5, 1923.

1,457,843

UNITED STATES PATENT OFFICE.

ELIAS LASHER, OF CATSKILL, NEW YORK.

VEHICLE SEAT.

Application filed March 5, 1921. Serial No. 449,994.

*To all whom it may concern:*

Be it known that I, ELIAS LASHER, a citizen of the United States, and a resident of Catskill, county of Greene, and State of New York, have invented certain new and useful Improvements in Vehicle Seats, of which the following is a full and complete specification, reference being made therein to the appended drawings.

This invention relates to passenger vehicles of the automobile type and is addressed primarily to improvements in the vehicle seats whereby the back of one seat may be converted into a cushioned support substantially bridging over the space between the cross seats. In the use of passenger automobiles for extended tourist travel, it is frequently desirable to convert the vehicle at the end of a days travel into a sleeping compartment for the passengers. This is accomplished by making the back of the front seat separate from the body of the vehicle and adjustable with respect to the latter in such manner that the back may be lowered to connect the front and rear seats. Thus a substantially uniform flat cushioned surface is provided upon which the passengers may recline in comfort.

It is an object of my invention to provide an improved device whereby the above results may be attained and at the same time preserve the conventional design of the passenger vehicle.

It is also an object of my invention to accomplish the above result in a manner insuring rigidity of the vehicle body as a whole, and preventing any relative lateral movement of the vehicle sides and seat-back. Specifically, I attain this result by positively locking the back of the seat to the side walls of the wagon body.

It is a further object of my invention to maintain the back of the seat in its normal position without any tendency to move out of line with the contiguous stationary parts of the seat-back.

In carrying out my invention I make use of an improved hand rail mounted upon the movable back of the seat, cooperating with the adjacent part of the vehicle seat when the device is used to form the back of the seat, and forming a support maintaining the adjustable part in the same plane with the seats of the vehicle when it is used to bridge the space between the seats.

The above and other advantages of my invention will be apparent from the following description of a preferred form of my improvement, reference being had therein to the accompanying drawings forming a part of these specifications.

In the drawings:

Fig. 1 is a rear elevation of my device;

Fig. 2 is a vertical section on the line 2—2 of Fig. 1;

Fig. 3 is a horizontal view through the hand-rail;

Fig. 4 is a detail view of the hand-rail locking means;

Fig. 5 is a detail view of the hand-rail journal, and

Fig. 6 is a perspective view of the bearing member for the journal.

A preferred form of my device is illustrated as applied to the vehicle body shown generally to consist in the side walls 7 and 8 with the floor member 9 connecting the same. As illustrated in Fig. 2, the conventional automobile body includes the front seat 10 and the rear seat 11 extending between the sides 7 and 8 of the body. The frame of the body supports the rear seat cushion 12 in the customary manner at a suitable distance above the floor 9. A similar cushion 13 forms the forward seat in the same plane with the rear seat 12 and suitably supported above the floor 9. A transverse back 14 connects the side walls 7 and 8 behind the front seat and forms a back for the seat.

As shown in Fig. 1, this back 14 is cut away vertically as at 15 and 16. The portion or panel 17 thus formed is hinged at its lower horizontal edge to the back 14 by means of hinges 18. Hooks 19 and 20 are seated in the back 14 in the manner illustrated in Fig. 3. These hooks are bent upward a short distance for a purpose that will appear later. The vertical edge of the back 14 terminates at 21 in close relationship to the edge 15 of the movable back panel 17. An abutment 22 attached to the back 14 or formed integral therewith, overlaps the edge 15 of the back 17 and maintains the panel 17, when raised vertically, in parallelism with the back 14.

The panel 17 carries a cylindrical sleeve 23 horizontally of hook member 19 and suitably spaced from the latter. This sleeve passes through the panel 17 and is firmly fixed therein with its axis perpendicular to the rear surface of the back. The sleeve is cut away to provide a slot 24, extending through approximately a quarter of the circumference and for equal distance above and below the horizontal.

Within the sleeve 23 is journalled a pivot member 25 the middle portion of which has a reduced diameter 26 adapted to fit the sleeve 23. The portion 26 terminates in a screw threaded end adapted to receive washers and lock nut 27. By means of the reduced portion 26 and the nut 27, the pivot member 25 is permitted to rotate freely within the sleeve 23 but without axial movement. The reduced portion 26 carries a radial pin 28 which moves within the slot 24 of the sleeve 23. As the slot is limited in length, there is a corresponding restriction to the rotary movement of the pivot member 25.

The pivot member 25 is slotted longitudinally to provide a deep groove 29 extending substantially into the reduced portion 26. A diametrical pin 30 is passed through the member 25 and groove 29.

A hand-rail, noted generally by the numeral 31, is provided. This hand-rail consists of the longitudinal portion 32 to one end of which is a right angled extension 33 terminating in an eyelet 34. This eyelet is seated within the groove 29 of the member 25. The transverse pivot pin 30 passes through the eyelet 34 and forms a pivot for the hand-rail. When the hand-rail is pivoted around the pin 30, so that the portion 33 is in contact with and parallel to the rear wall of the back panel 17, the middle portion 32 extends at right angles to the plane of the back.

The opposite end of the hand-rail consists of a closed handle member 35, generally rectangular in form. One side 36 of this handle is of considerable length and adapted, when the hand-rail is parallel with the back panel 17, to rest in parallel contact with the back 14 and the panel 17. In this manner, the member 36 forms an abutment limiting the backward movement of the member 17. The under surface of the member 36 carries a lug 37 having a forward wall 38. This lug 37 overhangs the outer side of the hook 19 while the forward wall 38 serves to wedge the pin 19 in toward the back 17 being itself held frictionally against accidental release.

In ordinary use, the back panel 17 is in the same plane with the back 14. The pin 28 permits the pivot member 25 to oscillate both above and below the horizontal plane for a short distance. With the hand-rail lifted out of the horizontal plane the member 36 rides over the end of the hook 19, and the back panel 17 is brought snugly against the abutment 22 with the outer surface of the back panel 17 in the same plane with the back 14. The hand-rail is then turned downward permitting the lug 37 to come to rest beyond the horizontal part of the hook 19 and firmly engage the latter with a wedging action. The back panel 17 is now firmly held against movement relative to the back 14 both laterally and longitudinally and a firm back provided for the front seat of the vehicle. The hand-rail projects for a short distance in the rear of the back 14 and provides in this position a handle 35 which is found very convenient by the persons entering the rear seating compartment. The action of the lugs is such as to bind the side walls of the vehicle body firmly to the seat back and prevent any lateral play or spreading of the walls during the running of the vehicle. A flexible strap may extend between the portions 33 in the customary manner.

When it is desired to depress the seat back and to form a couch the reverse operation is carried out to release the handle 35 from the hook 19. The hand-rail is then pivoted upon the pin 30 until the hand-rail takes the position at right angles with the plane of the panel 17. The two hand-rails operate alike and are each proportioned so that the outward movement as above described brings the handle members 35 a distance from the member 17 substantially equal to the distance separating the hinge 18 from the floor 9 of the vehicle. The back panel 17 is then lowered until the handles 35 rest upon the floor. In this position the cushions of the back panel 17 are substantially in the same plane with the seat cushions and form with the latter a substantially continuous couch. The hand-rails form spaced legs which serve to rigidly support the back in horizontal position. It is found that this form of hand-rail will maintain this position without being locked, although it is obvious that means may be provided to lock the hand-rails in extended position.

While I have shown one preferred form of my invention, it will be apparent that numerous changes may be made in the details shown without departing from the spirit of my invention as defined in the appended claims.

What I claim is:

1. In combination with a vehicle body, a vehicle seat having a seat proper, a back, holding means thereon, a panel hinged to the back, a hand-rail carried by said panel, a looped handle on the hand-rail, and a lug on the handle engaging said holding means.

2. In combination with a vehicle body, a vehicle seat having a seat proper, a back, a panel hinged to said back, a pivot member journalled in the panel, said pivot member being radially slotted to the surface of the panel, a hand rail pivoted within said slot and having a right angled portion for engagement with the surface of the panel when the hand rail is extended perpendicular to the surface of the panel to rest on the floor and to support the panel in its lowered position.

3. In combination with a vehicle body, a vehicle seat having a seat proper, a back, a panel hinged to said back intermediate the ends thereof, pivot members journaled in the panel, an individual hand rail carried by each pivot member and extending over the adjacent end of the back, means to attach said hand rails to the back to lock the seat together, and right angled portions on said hand rails for engagement with the surface of the panel when the hand rails are extended perpendicular to the surface of the panel to rest on the floor and to support the panel in its lowered position.

4. In combination with a vehicle body, a vehicle seat having a seat proper, a back, a panel hinged to said back, a bearing sleeve in the panel, said sleeve having a slot of limited extent, a pivot member journalled in said sleeve and having a pin in said slot, a hand rail carried by said pivot member, said slot being so disposed as to constrain the hand-rail to movement substantially limited to a plane parallel to the hinged edge between the panel and the back and thus prevent the hand rail from pivoting toward the hinged edge of the panel when the latter element is in its lowered position.

5. In combination with a vehicle body, a vehicle seat having a seat proper, a back, a panel hinged to said back, a pivot member journalled in said panel, a hand rail carried by said pivot member and extending over the adjacent end of the back, holding means on the back, said hand rail having a right angled portion for engagement with the pivot member, the opposite end of the hand rail having a corresponding angular looped portion on the same side of the hand rail with the first named portion for engagement with said holding means, said looped portion overlying the jointure of the panel and back.

In testimony whereof, I have hereunto affixed my signature.

ELIAS LASHER.